(No Model.)
J. C. CAMBURN.
SCHOOL FURNITURE.
No. 350,803. Patented Oct. 12, 1886.
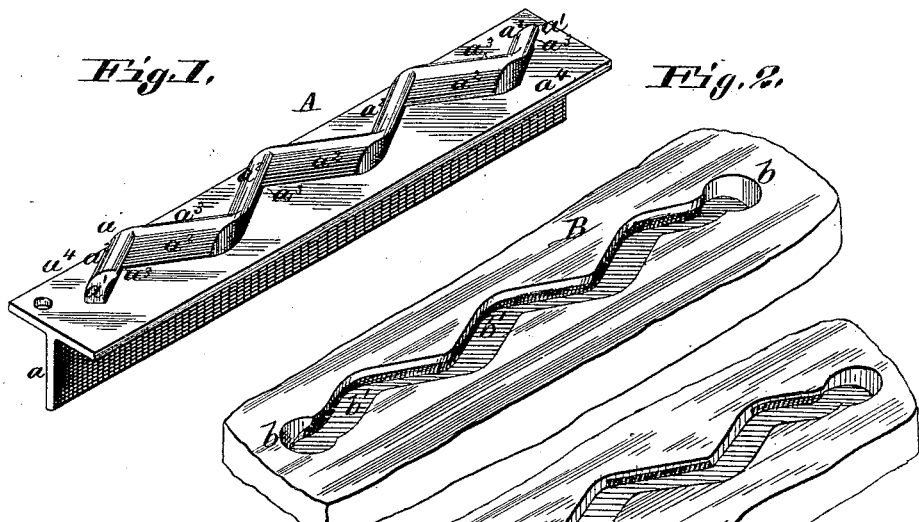
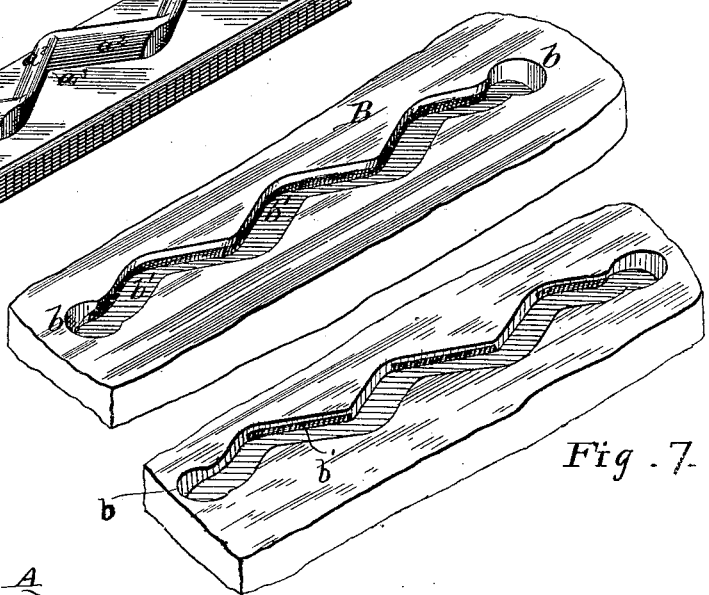
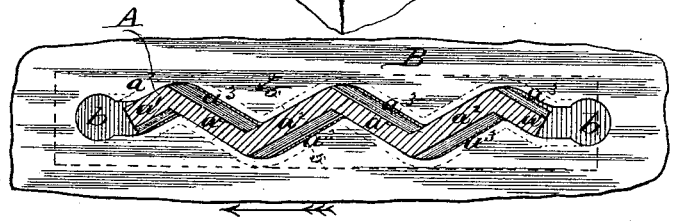
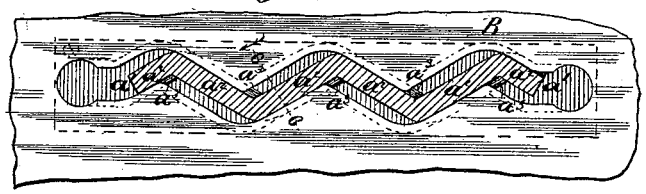
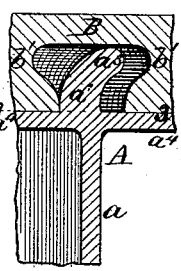
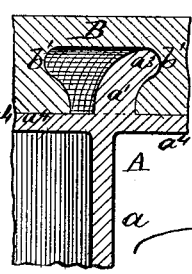
Attest:
F. A. Hopkins
Geo. L. Wheelock
Inventor:
Jacob C. Camburn
By Knight Bro.
Attys.

UNITED STATES PATENT OFFICE.

JACOB C. CAMBURN, OF ST. LOUIS, MISSOURI.

SCHOOL FURNITURE.

SPECIFICATION forming part of Letters Patent No. 350,803, dated October 12, 1886.

Application filed April 3, 1886. Serial No. 197,639. (No model.)

*To all whom it may concern:*

Be it known that I, JACOB C. CAMBURN, of the city of St. Louis, in the State of Missouri, have invented a certain new and useful Improvement in School Furniture, of which the following is a full, clear, and exact description, reference being had to the accompanying drawings, forming part of this specification, and in which—

Figure 1 is a perspective view of a bracket. Fig. 2 is a perspective view of part of a desk top, back, or seat, showing the undercut groove for its attachment to the bracket. Fig. 3 is a section at 3 3, Fig. 5. Fig. 4 is a section at 4 4, Fig. 6. Fig. 5 is a section at 5 5, Fig. 3. Fig. 6 is a section at 6 6, Fig. 4. Fig. 7 is a modification showing the undercut groove alternately on each side.

The device has a zigzag rib bent over in lips, as shown, and which enters a zigzag undercut groove of the top, back, or seat of a desk, seat, or table, as the case may be.

I have shown the bracket A in a separate piece with a rib, $a$, which may be secured in a kerf of a wood frame, or may be riveted to a metal frame; but where a metal frame is used the ribs $a$ may be cast upon the frame. The rib $a'$ is composed of a number of parts, $a^2$, set angularly to each other, so as to form the zigzag rib. Each of these parts $a^2$ is curved over so as to form side lips, $a^3$, said ribs being alternately on opposite sides, for the purpose of locking the rib in the groove by an endwise movement, as hereinafter set forth.

The part B, which may be part of a top, back, or seat, has preferably two or more zigzag grooves, $b$, which are undercut upon both sides, or alternately upon each side. These grooves may readily be made by a routing-tool having a part of larger diameter at the end which cuts the side grooves, $b'$, to receive the lips $a^3$ when the parts are secured together, as seen in Figs. 4 and 6.

In securing the parts together the part B is simply placed upon the part A, with the rib $a$ in the groove $b$, as seen in Figs. 3 and 5. Then the part B is moved in the direction of the arrow, which engages the part B firmly upon the bracket, as seen in Figs. 4 and 6, where the lips $a^3$ rest in the side grooves, $b'$. The side flanges, $a^4$, not only form a bearing upon which the inner face of the part B rests, but prevent the splitting of the sides of the groove $b$ by outward pressure of the lips $a^3$.

The zigzag groove is of the same width along its entire length and can be cut by one operation of the machine. A variation in the thickness of the width of the zigzag rib or the zigzag groove does not produce either undue tightness or looseness, for the reason that any two successive zigzag lips and grooves presented in opposite directions, when put together, act as a wedge and will fit tight.

School furniture can be easily taken apart and packed for shipment when constructed according to my invention, and it is as easily put up for use as well, which can be easily done by unskilled workmen.

This joint is well adapted to desks having a number of curved portions requiring fitting, as it is quite as easily put together as were the joint straight.

I am aware that the joints of school furniture have been constructed in various forms of undercut grooves in one member, and having correspondingly-flanged tongues or ribs in the other member, as shown in Patents Nos. 322,125 and 331,549, and these constructions I do not desire to claim; but

I claim as my invention—

1. The combination of board or part B, having zigzag grooves $b$ and the zigzag rib $a'$, having side lips, $a^3$, all inclining to one end of the rib, substantially as set forth.

2. The combination of a board or part, B, with an undercut zigzag groove and a zigzag rib, with side lips engaging in the enlarged inner part of the groove, for the purpose set forth.

JACOB C. CAMBURN.

In presence of—
SAML. KNIGHT,
JOS. WAHLE.